W. SOMERS.
STOP DEVICE FOR STEERING MECHANISM.
APPLICATION FILED NOV. 20, 1920.

1,410,963. Patented Mar. 28, 1922.

William Somers, INVENTOR

WITNESSES
Howard D. Orr
F. T. Chapman

BY C. G. Siggers
ATTORNEY

UNITED STATES PATENT OFFICE.

WILLIAM SOMERS, OF MEMPHIS, TENNESSEE.

STOP DEVICE FOR STEERING MECHANISM.

1,410,963. Specification of Letters Patent. Patented Mar. 28, 1922.

Application filed November 20, 1920. Serial No. 425,464.

*To all whom it may concern:*

Be it known that I, WILLIAM SOMERS, a citizen of the United States, residing at Memphis, in the county of Shelby and State of Tennessee, have invented a new and useful Improvement in Stop Devices for Steering Mechanism, of which the following is a specification.

This invention has reference to stop devices for steering mechanism, and is particularly adapted to use in connection with a certain make of automobile where the front wheel spindle is liable to be moved to such an extent as to throw the steering mechanism out of control, thus often causing serious accidents. The loss of control is due to turning the steering arm for the spindle past center, thus preventing the return movement of the steering wheel for the spindle by the operator.

The invention comprises an attachment which may be secured to the front axle of the vehicle in the path of the front wheel spindle, the attachment including a set screw and lock nut acting as an adjustable stop, by means of which the permissible turn of the front wheels may be regulated to avoid any liability of a past-center swing of the steering arm for the wheel spindle.

The attachment comprises a clamp with channels therein to adapt the clamp to the front axis of the vehicle in secure relation thereto, so that the movement of the front wheel spindles is less than that which would be liable to lock the wheels beyond center of the arc of turning.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawing:—

Figure 1:
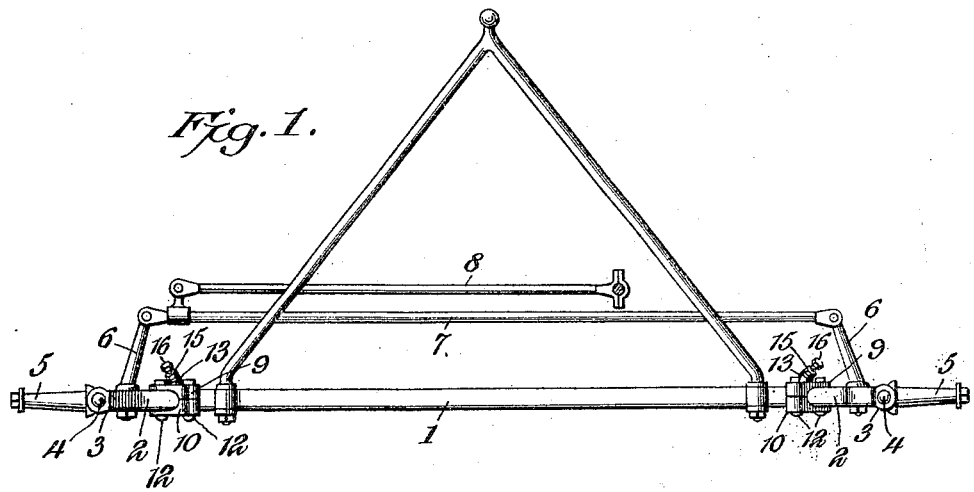
Figure 1 is a plan view of the front axle assembly of the automobile showing the invention applied.
Figure 2:
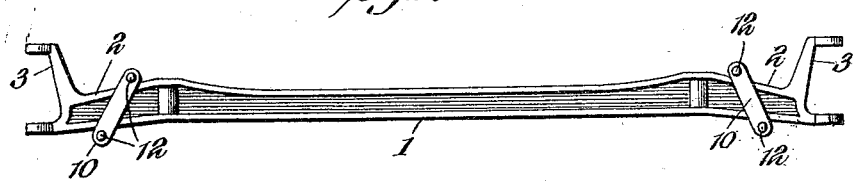
Fig. 2 is an elevation of the front axle separate from the automobile and showing the stop clamp of the invention applied.
Figure 3:
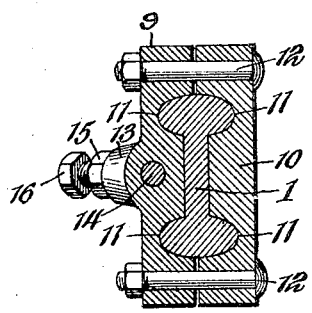
Fig. 3 is a cross section of the axle and clamp fast thereon.
Figure 4:
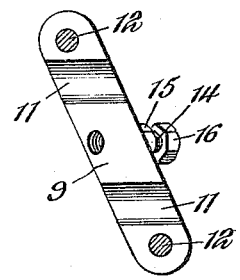
Fig. 4 is a view of one member of the clamp with the clamp bolts in cross section.

Referring to the drawings, there is shown an axle 1, illustrating the front axle of a well known make of automobile, which, because of the large number of automobiles of such make in use, requires no special description. It is to be understood, however, that the invention, while particularly adapted to the automobile referred to may be applied to other makes of automobiles. The axle 1 has ends 2 usually at an angle to the length of the axle and each end terminates in a yoke 3, through which there extends a spindle bolt 4 retaining a spindle 5 in the yoke.

Carried by the spindle is a spindle arm 6 at an angle to the spindle and the spindle arms of the two spindles for the front wheels are joined by a steering spindle connecting rod 7 to which there is attached a steering rod 8. It is a fault with the type of automobile steering assembly illustrated in the drawings that the spindle arms 6 with the spindles 5 may, on occasion, be moved through a larger arc than is necessary for steering so that the wheel spindles are moved to the extent of throwing the steering arm past center, thus causing the same to lock out of control of the operator and at an angle to the straight line of travel which will tend to upset the automobile if it be going at even a moderately fast speed. Moreover, the locking of the wheels out of control will at times cause collisions and other serious accidents.

The invention provides an attachment which may be quickly applied to the front axle in position to serve as stops for the spindle arms 6, one attachment being applied to one end portion of the axle and the other stop being applied to the other end portion of the axle so as to prevent excessive movement of the steering wheels in either direction.

The attachment for each end of the axle comprises two matching clamp blocks 9 and 10, each with a groove or channel therethrough on opposite sides of the middle of the block. The axle 1 is customarily of I cross section and the grooves 11 are made to conform to such cross section so that the blocks 9 and 10 when fastened together will grasp or embrace the axle against movement thereon. In order to hold the blocks 9 and 10 of the clamp on the axle, clamp bolts 12 are provided, traversing the blocks near opposite ends thereof. At an intermediate point on the block 9, there is formed the boss 13 tapped for the reception of a set screw 14 with the latter carrying a jam nut 15, thus permitting adjustment of the set screw and the locking of the screw in adjusted position. The set screw is provided with a head 16 suitably shaped for the application of a manipulating tool, and the screw 14 is so situated that its head 16 is in the path of the spindle arm 6 adjacent to it and is engaged by the spindle arm when the spindle is turned in steering in one direction, the parts being proportioned to allow the turning of the spindle just short of the point where locking would occur. For this reason the attachment may be applied and adjusted to permit the extreme position of the steering spindle within the realm of safety with the parts locked against any movement beyond the safe position.

The stop device for the steering mechanism may be applied by any one by using a wrench, and the nuts on the bolts and screws may be of such size as are commonly used on the machine, wherefore no tools but what are found in the tool kit of the machine are needed.

The clamp made up of the blocks 9 and 10 has the grooves 11 arranged at such an angle that the forces exerted upon the set screw 14 are at an angle to any movement which the clamp would be liable to have along the axle, so that loosening or slipping of the block would not occur in practice. Consequently the stop device when once adjusted will maintain its position despite any force liable to be exerted thereon.

The axle 1 is customarily of web and flange construction with the flanges at the portions to which the stop device is applied diverging toward the mid point of the axle, so that the stop device is firmly held against any movement lengthwise of the axle. The set screw 16 is located in the path of the spindle arm 6 at such an angle thereto as to be engaged by the spindle arm should the spindle be turned sufficiently, and the engagement is approximately at right angles, wherefore there is no liability of loosening the device under conditions of use, or breaking the device so that when once applied, the owner of the vehicle may feel assured that locking of the front wheels cannot occur and danger from such conditions is eliminated.

What is claimed is:—

1. In combination with the front axle of an automobile having a yoke, and a steering wheel spindle pivotally mounted therein, and provided with a spindle arm, a clamp applied to a fixed part of the front axle at a point spaced from the yoke, and an adjustable stop projecting from the clamp in the path of the spindle arm.

2. A stop device for the steering mechanism of an automobile, comprising a clamp member formed of matching blocks shaped to embrace the front axle of the automobile, said clamp blocks having clamp bolts traversing them on opposite sides of the axle and one of the blocks having a boss thereon, and a set screw threaded into the boss and provided with a lock nut to hold the screw in adjusted positions.

3. A stop device for the steering mechanism of an automobile comprising a clamp applied to the front axle of the automobile at an angle thereto, and provided with an adjustable set screw at an angle to the clamp to be lodged, when in place on the axle, in the path of the adjacent spindle arm.

In testimony, that I claim the foregoing as my own, I have hereto affixed signature.

WILLIAM SOMERS.